United States Patent
Lin

(10) Patent No.: US 9,618,086 B2
(45) Date of Patent: Apr. 11, 2017

(54) DUAL-CLUTCH TRANSMISSION

(71) Applicants: CHERY AUTOMOBILE CO., LTD., Wuhu, Anhui (CN); WUHU POWER-TECHNOLOGY RESEARCH CO., LTD., Wuhu, Anhui (CN)

(72) Inventor: Jian Lin, Wuhu (CN)

(73) Assignees: Chery Automobile Co., Ltd., Wuhu, Anhui (CN); Wuhu Power-Technology Research Co., Ltd., Wuhu, Anhui (CN)

( * ) Notice: Subject to any disclaimer, the term of this patent is extended or adjusted under 35 U.S.C. 154(b) by 130 days.

(21) Appl. No.: 14/410,867

(22) PCT Filed: Aug. 5, 2013

(86) PCT No.: PCT/CN2013/080838
§ 371 (c)(1),
(2) Date: Dec. 23, 2014

(87) PCT Pub. No.: WO2014/067309
PCT Pub. Date: May 8, 2014

(65) Prior Publication Data
US 2015/0337923 A1    Nov. 26, 2015

(30) Foreign Application Priority Data

Oct. 31, 2012    (CN) .......................... 2012 1 0430931

(51) Int. Cl.
*F16H 3/087*    (2006.01)
*F16H 3/093*    (2006.01)
(Continued)

(52) U.S. Cl.
CPC ............. *F16H 3/087* (2013.01); *F16H 3/006* (2013.01); *F16H 37/08* (2013.01);
(Continued)

(58) Field of Classification Search
CPC .......... F16H 3/006; F16H 3/087; F16H 37/08; F16H 2003/0931; F16H 2003/0933; F16H 2200/0056
(Continued)

(56) References Cited

U.S. PATENT DOCUMENTS

| 4,777,837 A | 10/1988 | Lehle |
| 6,755,089 B2 * | 6/2004 | Hirt .......................... F16H 3/006 74/329 |

(Continued)

FOREIGN PATENT DOCUMENTS

| CN | 102252063 A | 11/2011 |
| CN | 102269249 A | 12/2011 |

(Continued)

*Primary Examiner* — Terry Chau
(74) *Attorney, Agent, or Firm* — Bret E. Field; Bozicevic, Field & Francis LLP

(57) ABSTRACT

Disclosed is a dual-clutch transmission, using two input shafts (1, 2) and two driving shafts (3, 18), realizing seven forward gears (D1, D2, D3, D4, D5, D6, D7) and a reverse gear (R), eliminating a special reverse gear shaft for the reverse gear (R), and using eight synchronizers (S1, S2, S3, S4) to control the switching of all of the eight gears, namely the seven forward gears (D1, D2, D3, D4, D5, D6, D7) and the reverse gear (R), wherein part of the gears share a driving gear, so that the quantity of total parts and the axial length of the transmission are reduced; since the diameters of driven gears (14, 15, 16) of low-speed gears are relatively large, engagement sleeves of the corresponding synchronizers (S2, S3) can be arranged on the inner sides of the driven gears (14, 15, 16) according to structural arrangement requirements, so that an axial space is greatly saved; and the reverse gear shaft and a gear thereon are eliminated, the saved space facilitates the arrangement of a gear shaft fork mechanism, the supporting point of a gear shift fork can be close to the centers of the driving shafts (3, 18) and a gear (Continued)

shift execution mechanism in the absence of obstructions of the reverse gear shaft and the gear thereon, which is beneficial to the force distribution of the shift fork mechanism.

3 Claims, 2 Drawing Sheets

(51) Int. Cl.
    *F16H 37/08*     (2006.01)
    *F16H 3/00*     (2006.01)

(52) U.S. Cl.
    CPC ............ *F16H 2003/0931* (2013.01); *F16H 2003/0933* (2013.01); *F16H 2200/0056* (2013.01); *F16H 2200/2076* (2013.01)

(58) Field of Classification Search
    USPC .................................................. 74/330, 331
    See application file for complete search history.

(56) References Cited

U.S. PATENT DOCUMENTS

| | | | | |
|---|---|---|---|---|
| 7,225,696 | B2* | 6/2007 | Gitt | F16H 3/006 74/329 |
| 7,287,442 | B2* | 10/2007 | Gumpoltsberger | B60K 17/08 74/331 |
| 7,597,020 | B2* | 10/2009 | Baldwin | B60W 10/113 74/330 |
| 7,610,825 | B2* | 11/2009 | Hendrickson | F16H 3/006 74/330 |
| 7,690,278 | B2* | 4/2010 | Burgardt | F16H 3/006 74/331 |
| 2008/0196526 | A1* | 8/2008 | Singh | F16H 3/006 74/331 |

FOREIGN PATENT DOCUMENTS

| | | |
|---|---|---|
| CN | 202152833 U | 2/2012 |
| CN | 102996746 A | 3/2013 |
| CN | 202914643 U | 5/2013 |
| EP | 2428699 A1 | 3/2012 |

* cited by examiner

DUAL-CLUTCH TRANSMISSION

TECHNICAL FIELD

The present invention belongs to a technical field of automobile construction, and relates to a structure of an automobile power system. More particularly, the present invention relates to a dual-clutch transmission.

BACKGROUND OF THE PRESENT INVENTION

Since the dual-clutch transmission adopts a dual-clutch system and a conventional fixed-axle gear transmission, it has a higher transmission efficiency, a shorter system power interruption duration during a gear shift, and favorable driving comfort and fuel economy. The Dual-clutch transmission has gradually become a hot spot in the development of the transmission industry since it was successfully commercialized and installed in automobiles by Volkswagen.

A Chinese Patent CN 102084153A discloses a dual-clutch transmission having two input shafts connected to a first clutch or a second clutch, respectively. Two driving shafts, provided above and below the input shafts, transmit a torque to a differential via driving gears on the driving shafts. To achieve a reverse gear, another shaft is further provided above the second driving shaft. The reverse gear is achieved as follows: a torque of the first input shaft is transferred to a shaft for the reverse gear via a corresponding gear pair and then transferred to the second driving shaft via a reverse-gear gear, and finally the torque is applied to the differential via the driving gears of the driving shafts. In such a dual-clutch transmission, the arrangement of providing a specific shaft for the reverse gear will largely limit the arrangement of a gear shift mechanism and the overall structural arrangement of the transmission, preventing the realization of a compact structural form.

A Chinese Patent CN1910387B discloses a seven-gear dual-clutch transmission, which is provided with an intermediate gear for realizing a reverse gear on a second driving shaft, this intermediate gear having different transmission stages; meanwhile, a third driving shaft, with a reverse-gear synchronizer, a reverse-gear driven gear, a primary reduction driving gear and the like provided thereon, is further provided in this dual-clutch transmission, and the power of the reverse gear is output through the third driving shaft. This transmission has two input shafts and three output shafts in total, which hampers the realization of a compact structural form. In addition, because this dual-clutch transmission employs five synchronizers, and a six-gear and reverse-gear synchronizer works only with its half side, it results in a large number of parts and a complicate structure of a gear shift fork for the six-gear and reverse-gear synchronizer.

SUMMARY OF THE PRESENT INVENTION

The present invention provides a dual-clutch transmission with an object of optimizing its structure to be simpler, more reasonable and compact, and facilitating the compactness or flexibility of a gear shift driving mechanism.

In order to achieve the above object, the present invention employs the following technical solutions.

The dual-clutch transmission according to the present invention includes an input section, a driving section and an output section, the input section including a first input shaft and a second input shaft, which are arranged coaxially; the first input shaft is connected to a first clutch, and the second input shaft is connected to a second clutch;

the second input shaft is a hollow shaft, which is sheathing outside the first input shaft;

the driving section includes a first driving shaft and a second driving shaft;

the output section includes a differential, the differential being connected to the first driving shaft and the second driving shaft without relative rotation, that is, a primary reduction driven gear on the differential is engaged with a first driving shaft primary reduction driving gear on the first driving shaft and a second driving shaft primary reduction driving gear on the second driving shaft, respectively; the dual-clutch transmission is provided with seven forward gears and one reverse gear.

a first preferred solution is as follows:

a third-gear and fifth-gear driving gear, a first-gear driving gear and a seventh-gear driving gear are fixed on the first input shaft in sequence;

a second-gear driving gear and a fourth-gear and six-gear driving gear are fixed on the second input shaft in sequence;

the third-gear and fifth-gear driving gear is located on a rear side of the transmission far away from the dual clutches, and the fourth-gear and six-gear driving gear is located on a front side of the transmission close to the dual clutches;

a third-gear driven gear, a first-gear driven gear, a second-gear driven gear and a fourth-gear driven gear are arranged on the first driving shaft in sequence, and a first-gear and third-gear synchronizer and a second-gear and fourth-gear synchronizer are further fixed on the first driving shaft;

the first-gear and third-gear synchronizer is located between the first-gear driven gear and the third-gear driven gear, and the second-gear and fourth-gear synchronizer is located between the second-gear driven gear and the fourth-gear driven gear;

the third-gear driven gear is located on the rear side of the transmission far away from the dual clutches, and the fourth-gear driven gear is located on the front side of the transmission close to the dual clutches;

a fifth-gear driven gear, a seventh-gear driven gear, a reverse-gear driven gear and a sixth-gear driven gear are arranged on the second driving shaft in sequence, and a fifth-gear and seventh-gear synchronizer and a sixth-gear and reverse-gear synchronizer are further fixed on the second driving shaft;

the fifth-gear and seventh-gear synchronizer is located between the fifth-gear driven gear and the seventh-gear driven gear, and the sixth-gear and reverse-gear synchronizer is located between the sixth-gear driven gear and the reverse-gear driven gear; and the fifth-gear driven gear is located on the rear side of the transmission far away from the dual clutches, and the sixth-gear driven gear is located on the front side of the transmission close to the dual clutches.

The number of teeth of the first driving shaft primary reduction driving gear on the first driving shaft is less than number of teeth of the second driving shaft primary reduction driving gear on the second driving shaft;

the reverse-gear driven gear is engaged with the first-gear driven gear second gear, the driven gears for the other gears are engaged with the corresponding driving gears, respectively, and the gear pair for each gear is located in the same plane; and when it is required to perform a gear shift, the driven gear for a corresponding gear is connected to a driving shaft via a synchronizer to allow the driving shaft to synchronously rotate with the driven gear for the gear, so as to realize the gear shift.

The first-gear driven gear, having a first-gear driven gear first gear and a first-gear driven gear second gear, is a stepped gear idly which is sheathing around the first driving shaft;

the first-gear driven gear first gear and the first-gear driven gear second gear are connected to each other without relative rotation; and the diameter of the first-gear driven gear first gear is greater than that of the first-gear driven gear second gear.

The first-gear driven gear first gear is engaged with the first-gear driving gear, while the first-gear driven gear second gear is engaged with the reverse-gear driven gear to realize a switchover of the reverse gear.

The second preferred solution is as follows:

a fifth-gear and seventh-gear driving gear, a third-gear driving gear and a first-gear driving gear are fixed on the first input shaft in sequence;

a second-gear driving gear and a fourth-gear and sixth-gear driving gear are fixed on the second input shaft in sequence;

the fifth-gear and seventh-gear driving gear is located on a rear side of the transmission far away from the dual clutches, and the fourth-gear and sixth-gear driving gear is located on a front side of the transmission close to the dual clutches;

a fifth-gear driven gear, a first-gear driven gear, a second-gear driven gear and a fourth-gear driven gear are arranged on the first driving shaft in sequence, and a first-gear and fifth-gear synchronizer and a second-gear and fourth-gear synchronizer are also fixed on the first driving shaft;

the first-gear and fifth-gear synchronizer is located between the first-gear driven gear and the fifth-gear driven gear, and the second-gear and fourth-gear synchronizer is located between the second-gear driven gear and the fourth-gear driven gear;

the fifth-gear driven gear is located on the rear side of the transmission far away from the dual clutches, and the fourth-gear driven gear is located on the front side of the transmission close to the dual clutches;

a seventh-gear driven gear, a third-gear driven gear, a reverse-gear driven gear and a sixth-gear driven gear are arranged on the second driving shaft in sequence, and a third-gear and seventh-gear synchronizer and a sixth-gear and reverse-gear synchronizer are also fixed on the second driving shaft;

the third-gear and seventh-gear synchronizer is located between the third-gear driven gear and the seventh-gear driven gear, and the sixth-gear and reverse-gear synchronizer is located between the sixth-gear driven gear and the reverse-gear driven gear; and the seventh-gear driven gear is located on the rear side of the transmission far away from the dual clutches, and the sixth-gear driven gear is located on the front side of the transmission close to the dual clutches.

The number of teeth of the first driving shaft primary reduction driving gear on the first driving shaft is less than number of teeth of the second driving shaft primary reduction driving gear on the second driving shaft;

the reverse-gear driven gear is engaged with the first-gear driven gear second gear, the driven gears for the other gears are engaged with the corresponding driving gears, respectively, and the gear pair for each gear is located in the same plane; and when it is required to perform a gear shift, the driven gear for a corresponding gear is connected to a driving shaft via a synchronizer to allow the driving shaft to synchronously rotate with the driven gear for this gear, so as to realize the gear shift.

The first-gear driven gear, having a first-gear driven gear first gear and a first-gear driven gear second gear, is a stepped gear idly which is sheathing around the first driving shaft;

the first-gear driven gear first gear and the first-gear driven gear second gear are connected to each other without relative rotation;

the diameter of the first-gear driven gear first gear is greater than that of the first-gear driven gear second gear; and the first-gear driven gear first gear is engaged with the first-gear driving gear, while the first-gear driven gear second gear is engaged with the reverse-gear driven gear, so as to realize a switchover of the reverse gear.

With above technical solutions according to the present invention, two input shafts and two driving shafts are used to configure seven forward gears and one reverse gear, thus omitting one reverse gear shaft. Meanwhile, by providing a first-gear driven gear and a second-gear driven gear on a driving shaft having a primary reduction driving gear with relatively less teeth number and providing a sixth-gear driven gear and a seventh-gear driven gear on another driving shaft having a primary reduction driving gear with relatively more teeth number, an optimal configuration of the gear size and the transmission ratio for each gear is realized. Therefore, this arrangement is compact, simple and reasonable in structure, and there are fewer numbers of gears, shafts and synchronizer parts. As the diameter of the first-gear, second-gear and third-gear driven gears is large, engagement sleeves of the synchronizers for these gears may be arranged inside the gears, which greatly save an axial space in conjunction with the reasonable arrangement of the position of the gears. As one reverse gear shaft is omitted, the saved space facilitates the arrangement of the gear shaft fork mechanism.

Figure 1:
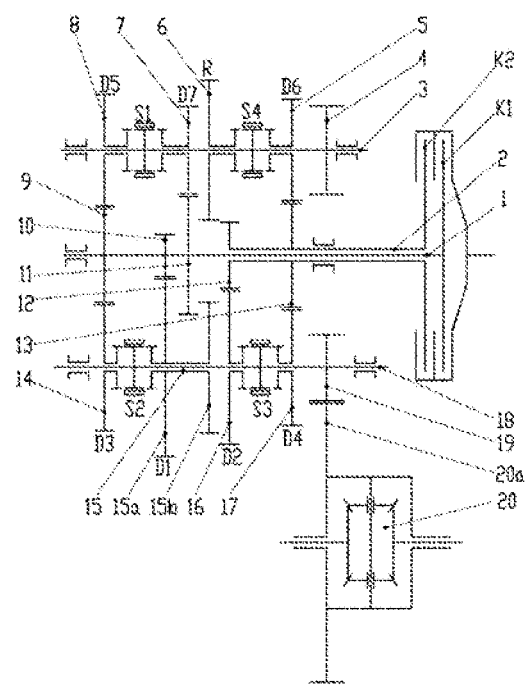
FIG. 1 is a structural diagram of a dual-clutch transmission according to Embodiment 1 of the present invention.

1: First input shaft; 2: Second input shaft; 3: Second driving shaft; 4: Second driving shaft primary reduction driving gear; 5: Sixth-gear driven gear; 6: Reverse-gear driven gear; 7: Seventh-gear driven gear; 8: Fifth-gear driven gear; 9: Third-gear and fifth-gear driving gear; 10: First-gear driving gear; 11: Seventh-gear driving gear; 12: Second-gear driving gear; 13: Fourth-gear and sixth-gear driving gear; 14: Third-gear driven gear; 15: First-gear driven gear (including 15*a* and 15*b*); 15*a*: First-gear driven gear first gear; 15*b*: First-gear driven gear second gear; 16: Second-gear driven gear; 17: Fourth-gear driven gear; 18: First driving shaft; 19: First driving shaft primary reduction driving gear; 20: Differential (including 20*a*); 20*a*: Primary reduction driven gear; 30: Fifth-gear and seventh-gear driving gear; 31: Third-gear driving gear; K1: First clutch; K2: Second clutch; D1: First-gear; D2: Second-gear; D3: Third-gear; D4: Fourth-gear; D5: Fifth-gear; D6: Sixth-gear; D7: Seventh-gear; R: Reverse-gear;

in FIG. 1:

S1: Fifth-gear and seventh-gear synchronizer; S2: First-gear and third-gear synchronizer; S3: Second-gear and fourth-gear synchronizer; S4: Sixth-gear and reverse-gear synchronizer; and in FIG. 3:

S1: Third-gear and seventh-gear synchronizer; S2: First-gear and fifth-gear synchronizer; S3: Second-gear and fourth-gear synchronizer; S4: Sixth-gear and reverse-gear synchronizer.

DETAILED DESCRIPTION OF THE PRESENT INVENTION

To help those skilled in the art to have more complete, accurate and deep understanding of inventive concepts and technical solutions of the present invention, the specific implementations of the present invention will be further described as below in details by a description of the embodiments with reference to the accompanying drawings.

The structure of the present invention as shown in each drawing is a dual-clutch transmission, including an input section, a driving section and an output section.

The input section includes a first input shaft 1 and a second input shaft 2, which are arranged coaxially; the first input shaft 1 is connected to a first clutch K1, and the second input shaft 2 is connected to a second clutch K2;

The second input shaft 2 is a hollow shaft which is sheathing outside the first input shaft 1;

the driving section includes a first driving shaft 18 and a second driving shaft 3;

the output section includes a differential 20, a primary reduction driven gear 20a on the differential 20 being engaged with a first driving shaft primary reduction driving gear 19 on the first driving shaft 18 and a second driving shaft primary reduction driving gear 4 on the second driving shaft 3, respectively; the shafts are parallel to each other and are arranged horizontally.

The dual-clutch transmission is provided with seven forward gears, i.e., first-gear D1, second-gear D2, third-gear D3, fourth-gear D4, fifth-gear D5, sixth-gear D6 and seventh-gear D7 and one reverse gear R.

The seven-gear dual-clutch transmission according to the present invention is in a compact type with the following advantages.

1. Two input shafts and two driving shafts are used to configure seven forward gears and one reverse gear, thus omitting one shaft for the reverse gear. Meanwhile, by providing a first-gear driven gear and a second-gear driven gear on a driving shaft having a primary reduction driving gear with relatively less teeth number and providing a sixth-gear driven gear and a seventh-gear driven gear on another driving shaft having a primary reduction driving gear with relatively more teeth number, the configuration of the gear size and the transmission ratio for each gear is optimized. Therefore, this configuration is compact, simple and reasonable in structure, and there are fewer numbers of gears, shafts, and synchronizer parts.

2. As the driven gears for the first-gear, second-gear and third-gear have a relatively larger diameter, the engagement sleeves of the synchronizers for these gears may be arranged inside the gears, which may greatly save an axial space in conjunction with the reasonable arrangement of the position of the gears.

3. As one reverse gear shaft is omitted, the saved space facilitates the arrangement of the gear shift fork mechanism.

It is well known that the low-speed gears of a transmission are generally D1 and D2 both requiring a very large total transmission ratio, while the high-speed gears of a transmission are generally a highest gear and a second-highest gear both requiring a relatively small total transmission ratio; and a total transmission ratio of each gear of a transmission is a product obtained by multiplying a transmission ratio of a gear pair of each gear by a primary reduction ratio (i.e., a quotient obtained by dividing the number of teeth of a primary reduction driven gear by the number of teeth of a primary reduction driving gear).

The dual-clutch transmission according to the present invention has two driving shafts, i.e., two primary reduction ratios. Generally, the two primary reduction ratios have different values, a low-speed gear provided with a larger primary reduction ratio and a high-speed gear provided with a smaller primary reduction ratio, which has an advantage that a size difference of the diameters of a pair of engaged gears for each gear may be reduced, so that the stress applied to the gears becomes uniform.

Therefore, in the present invention, by providing a first-gear driven gear and a second-gear driven gear on a first driving shaft having a primary reduction driving gear with relatively less teeth number and providing a sixth-gear driven gear and a seventh-gear driven gear on a second driving shaft having a primary reduction driving gear with relatively more teeth number, the configuration of the gear size and the transmission ratio for each gear is optimized.

The general concept of the present invention will be described as below.

The driving gears for each gears are connected to the first input shaft or the second input shaft without relative rotation, in which, some of the driving gears are used as driving gears for two gears meanwhile, the driven gear for each gear is idly sheathing around the first driving shaft or the second driving shaft, and the driven gears and the two driving shafts are connected to each other via a synchronizer, so as to configure each gear.

The first-gear driven gear disposed on one of the driving shafts is used as a reverse-gear idle gear for realizing switchover of the reverse gear, in which the first-gear driven gear is arranged on one of the driving shafts, the reverse-gear driven gear is arranged on the other one of the driving shafts, and the number of teeth of a primary reduction driving gear of a driving shaft with the first gear arranged thereon is less than the number of teeth of a primary reduction driving gear of a driving shaft with the reverse-gear driven gear arranged thereon; and, the first-gear driven gear is a stepped gear and has one first gear and one second gear, the diameter of the first gear being greater than that of the second gear, in which, the first gear is engaged with the first-gear driven gear and the second gear is engaged with the reverse-gear driven gear, so as to realize a switchover of the reverse gear; where, by setting the number of teeth of the second gear on the first-gear driven gear and the number of teeth of the reverse-gear driven gear, an ideal reverse gear ratio may be obtained; and where the reverse-gear driven gear and an even-gear (for example, sixth-gear) driven gear are arranged on the same driving shaft and share one synchronizer.

Embodiment 1

In order to solve the problems in the prior art and overcome the deficiencies thereof, and to achieve the inventive purpose of optimizing the structure to be simpler, more reasonable and compact, the present invention adopts the following technical solutions.

Figure 2:
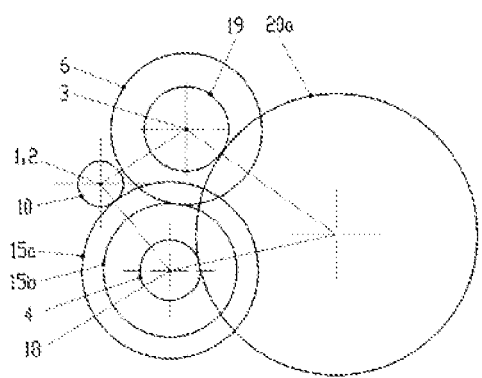
FIG. 2 is a schematic diagram of spatial positional relationship of the following components of the dual-clutch transmission according to the present invention.

As shown in FIG. 1 and FIG. 2, in the dual-clutch transmission according to the present invention:

a third-gear and fifth-gear driving gear 9, a first-gear driving gear 10 and a seventh-gear driving gear 11 are fixed on the first input shaft 1 in sequence;

a second-gear driving gear 12 and a fourth-gear and six-gear driving gear 13 are fixed on the second input shaft 2 in sequence;

the third-gear and fifth-gear driving gear 9 is located on a rear side of the transmission far away from the dual clutches, and the fourth-gear and six-gear driving gear 13 is located on a front side of the transmission close to the dual clutches;

a third-gear driven gear 14, a first-gear driven gear 15, a second-gear driven gear 16 and a fourth-gear driven gear 17 are arranged on the first driving shaft 18 in sequence, and a first-gear and third-gear synchronizer S2 and a second-gear and fourth-gear synchronizer S3 are further fixed on the first driving shaft 18;

the first-gear and third-gear synchronizer S2 is located between the first-gear driven gear 15 and the third-gear driven gear 14, and the second-gear and fourth-gear synchronizer S3 is located between the second-gear driven gear 16 and the fourth-gear driven gear 17;

the third-gear driven gear 14 is located on the rear side of the transmission far away from the dual clutches, and the fourth-gear driven gear 17 is located on the front side of the transmission close to the dual clutches;

a fifth-gear driven gear 8, a seventh-gear driven gear 7, a reverse-gear driven gear 6 and a sixth-gear driven gear 5 are arranged on the second driving shaft 3 in sequence, and a fifth-gear and seventh-gear synchronizer S1 and a sixth-gear and reverse-gear synchronizer S4 are further fixed on the second driving shaft 3;

the fifth-gear and seventh-gear synchronizer S1 is located between the fifth-gear driven gear 8 and the seventh-gear driven gear 7, and the sixth-gear and reverse-gear synchronizer S4 is located between the sixth-gear driven gear 5 and the reverse-gear driven gear 6; and the fifth-gear driven gear 8 is located on a rear side of the transmission far away from the dual clutches, and the sixth-gear driven gear 5 is located on a front side of the transmission close to the dual clutches.

The number of teeth of the first driving shaft primary reduction driving gear 19 on the first driving shaft 18 is less than the number of teeth of the second driving shaft primary reduction driving gear 4 on the second driving shaft 3;

the reverse-gear driven gear 6 is engaged with the first-gear driven gear second gear 15b, the driven gears for the other gears are engaged with the corresponding driving gears, respectively, and the gear pair for each gear is substantially located in the same plane; and when it is required to perform a gear shift, the driven gear for a corresponding gear is connected to a driving shaft via a synchronizer to allow the driving shaft to synchronously rotate with the driven gear for this gear, so as to perform the gear shift.

FIG. 1 does not show the engagement relationship between the second gear 15b on the first-gear driven gear 15 and the reverse-gear driven gear 6, as well as the engagement relationship between a second driving shaft primary reduction driving gear 4 and a primary reduction driven gear 20a, because the first input shaft 1, the second input shaft 2, the first driving shaft 18 and the second driving shaft 3 are all illustrated in a planar manner in FIG. 1 for the purpose of illustration, although they are arranged spatially in 3 dimensions.

FIG. 2, which is a right view of FIG. 1, shows the spatial configuration of the first input shaft 1, the second input shaft 2, the first driving shaft 18 and the second driving shaft 3, in which, some gears shown in FIG. 1 are intentionally omitted, in order to better illustrate the spatial relationships between rotating shafts of the rotating components.

The first-gear driven gear 15, having a first-gear driven gear first gear 15a and a first-gear driven gear second gear 15b, is a stepped gear idly which is sheathing around the first driving shaft 18;

the first-gear driven gear first gear 15a and the first-gear driven gear second gear 15b are connected to each other without relative rotation;

the diameter of the first-gear driven gear first gear 15a is greater than that of the first-gear driven gear second gear 15b;

the first-gear driven gear first gear 15a is engaged with the first-gear driving gear 10, while the first-gear driven gear second gear 15b is engaged with the reverse-gear driven gear 6 to perform a switchover of the reverse gear.

From above description of the technical solutions of Embodiment 1, it can be known that:

1. A third-gear and fifth-gear driving gear, a first-gear driving gear and a seventh-gear driving gear are fixed on the first input shaft in sequence; and a second-gear driving gear and a fourth-gear and six-gear driving gear are fixed on the second input shaft in sequence.

By sharing a driving gear, the length of the input shafts may be shortened, and meanwhile the staggered arrangement of driven gears for two gears engaged with the driving gear is avoided, thus shortening the length of the output shafts. The driving gears for odd gears and even gears are arranged on two input shafts, respectively, and the two input shafts transfer power alternatively during a gear shift, thus ensuring that the power will not be interrupted during the gear shift.

2. A third-gear driven gear, a first-gear driven gear, a second-gear driven gear and a fourth-gear driven gear are arranged on a driving shaft in sequence, and a first-gear and third-gear synchronizer and a second-gear and fourth-gear synchronizer are further fixed on the driving shaft, with the first-gear and third-gear synchronizer being located between the first-gear driven gear and the third-gear driven gear, and the second-gear and fourth-gear synchronizer being located between the second-gear driven gear and the fourth-gear driven gear; and, a fifth-gear driven gear, a seventh-gear driven gear, a reverse-gear driven gear and a sixth-gear driven gear are arranged on the second driving shaft in sequence, and a fifth-gear and seventh-gear synchronizer and a sixth-gear and reverse-gear synchronizer are further fixed on the second driving shaft, with the fifth-gear and seventh-gear synchronizer being located between the fifth-gear driven gear and the seventh-gear driven gear, and the sixth-gear and reverse-gear synchronizer being located between the sixth-gear driven gear and the reverse-gear driven gear.

The driven gear for each gear is mounted on respective driving shaft via a bearing, the reverse-gear driven gear is engaged with the first-gear driven gear (in the shape of a stepped gear) second gear, the driven gears for the other gears are engaged with the corresponding driving gears, respectively, and the gear pair for each gear is substantially located in the same plane. When it is required to perform a gear shift, the driven gear for a corresponding gear is connected to a driving shaft via a synchronizer to allow the driving shaft to synchronously rotate with the driven gear for this gear, so as to realize the gear shift.

Embodiment 2

In order to achieve the same object as that of above technical solutions, the present invention employs the following technical solutions.

Figure 3:
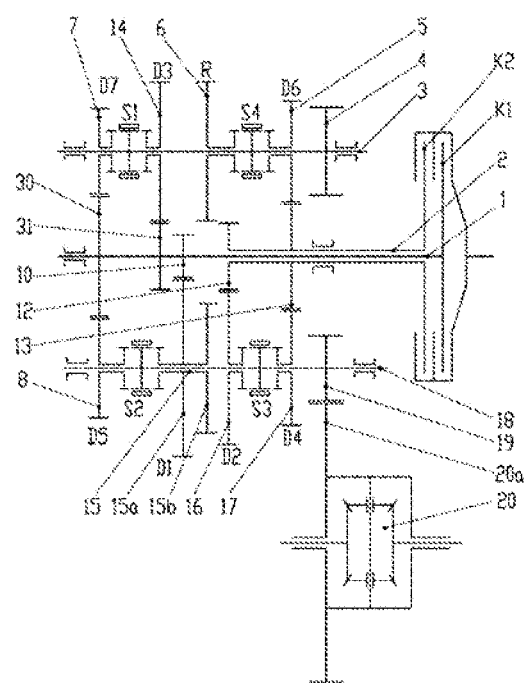
FIG. 3 is a structural diagram of a dual-clutch transmission according to Embodiment 2 of the present invention.

As shown in FIG. 2 and FIG. 3, in a dual-clutch transmission according to the present invention:

a fifth-gear and seventh-gear driving gear 30, a third-gear driving gear 31 and a first-gear driving gear 10 are fixed on the first input shaft 1 in sequence;

a second-gear driving gear 12 and a fourth-gear and sixth-gear driving gear 13 are fixed on the second input shaft 2 in sequence;

the fifth-gear and seventh-gear driving gear 30 is located on a rear side of the transmission far away from the dual clutches, and the fourth-gear and sixth-gear driving gear 13 is located on a front side of the transmission close to the dual clutches;

a fifth-gear driven gear 8, a first-gear driven gear 15, a second-gear driven gear 16 and a fourth-gear driven gear 17 are arranged on the first driving shaft 18 in sequence, and a first-gear and fifth-gear synchronizer S2 and a second-gear and fourth-gear synchronizer S3 are also fixed on the first driving shaft 18;

the first-gear and fifth-gear synchronizer S2 is located between the first-gear driven gear 15 and the fifth-gear driven gear 8, and the second-gear and fourth-gear synchronizer S3 is located between the second-gear driven gear 16 and the fourth-gear driven gear 17;

the fifth-gear driven gear 8 is located on a rear side of the transmission far away from the dual clutches, and the fourth-gear driven gear 17 is located on a front side of the transmission close to the dual clutches;

a seventh-gear driven gear 7, a third-gear driven gear 14, a reverse-gear driven gear 6 and a sixth-gear driven gear 5 are arranged on the second driving shaft 3 in sequence, and a third-gear and seventh-gear synchronizer S1 and a sixth-gear and reverse-gear synchronizer S4 are also fixed on the second driving shaft 3;

the third-gear and seventh-gear synchronizer S1 is located between the third-gear driven gear 14 and the seventh-gear driven gear 7, and the sixth-gear and reverse-gear synchronizer S4 is located between the sixth-gear driven gear 5 and the reverse-gear driven gear 6; and the seventh-gear driven gear 7 is located on a rear side of the transmission far away from the dual clutches, and the sixth-gear driven gear 5 is located on a front side of the transmission close to the dual clutches.

The number of teeth of the first driving shaft primary reduction driving gear 19 on the first driving shaft 18 is less than the number of teeth of the second driving shaft primary reduction driving gear 4 on the second driving shaft 3;

the reverse-gear driven gear 6 is engaged with the first-gear driven gear second gear 15*b*, the driven gears for the other gears are engaged with the corresponding driving gears, respectively, and the gear pair for each gear is located in the same plane; and when it is required to perform a gear shift, the driven gear for a corresponding gear is connected to a driving shaft via a synchronizer to allow the driving shaft to synchronously rotate with the driven gear for this gear, so as to realize the gear shift.

FIG. 2 does not show the engagement relationship between the second gear 15*b* on the first-gear driven gear and the reverse-gear driven gear 6, as well as the engagement relationship between a second driving shaft primary reduction driving gear 4 and a primary reduction driven gear 20*a* because the first input shaft 1, the second input shaft 2, the first driving shaft 18 and the second driving shaft 3 are all illustrated in a planar manner in FIG. 2 for the purpose of illustration, although they are arranged spatially in three dimensions.

The first-gear driven gear 15, having a first-gear driven gear first gear 15*a* and a first-gear driven gear second gear 15*b*, is a stepped gear idly which is sheathing around the first driving shaft 18;

the first-gear driven gear first gear 15*a* and the first-gear driven gear second gear 15*b* are connected to each other without relative rotation;

the diameter of the first-gear driven gear first gear 15*a* is greater than that of the first-gear driven gear second gear 15*b*; and the first-gear driven gear first gear 15*a* is engaged with the first-gear driving gear 10, while the first-gear driven gear second gear 15*b* is engaged with the reverse-gear driven gear 6 to realize a switchover of the reverse gear.

From above analysis to the technical solution of Embodiment 2, it can be known that:

1. A fifth-gear and seventh-gear driving gear, a third-gear driving gear and a first-gear driving gear are fixed on the first input shaft in sequence; and a second-gear driving gear and a fourth-gear and sixth-gear driving gear are fixed on the second input shaft in sequence.

The driving gears for odd gears and even gears are arranged on two input shafts, respectively, and the two input shafts transfer power alternatively during a gear shift, thus ensuring that the power will not be interrupted during the gear shift.

2. A fifth-gear driven gear, a first-gear driven gear, a second-gear driven gear and a fourth-gear driven gear are arranged on the first driving shaft in sequence, and a first-gear and fifth-gear synchronizer and a second-gear and fourth-gear synchronizer are also fixed on the first driving shaft, with the first-gear and fifth-gear synchronizer being located between the first-gear driven gear and the fifth-gear driven gear and the second-gear and fourth-gear synchronizer being located between the second-gear driven gear and the fourth-gear driven gear; and, a seventh-gear driven gear, a third-gear driven gear, a reverse-gear driven gear and a sixth-gear driven gear are arranged on the second driving shaft in sequence, and a third-gear and seventh-gear synchronizer and a sixth-gear and reverse-gear synchronizer are also fixed on the second driving shaft, with the third-gear and seventh-gear synchronizer being located between the third-gear driven gear and the seventh-gear driven gear, and the sixth-gear and reverse-gear synchronizer is located between the sixth-gear driven gear and the reverse-gear driven gear.

The driven gear for each gear is mounted on respective driving shaft via a bearing, the reverse-gear driven gear is engaged with the second gear of the first-gear driven gear (in the shape of a stepped gear), the driven gears for the other gears are engaged with the corresponding driving gears, respectively, and the gear pair for each gear is substantially located in the same plane. When it is required to perform a gear shift, the driven gear for a corresponding gear is connected to a driving shaft via a synchronizer to allow the driving shaft to synchronously rotate with the driven gear for this gear, so as to realize the gear shift.

In summary of above, in the dual-clutch transmission according to the present invention, two input shafts and two driving shafts are used to configure seven forward gears and one reverse gear, thus omitting one reverse gear shaft specific for the reverse gear in the dual-clutch transmissions of the prior art.

In the present invention, eight synchronizers are used to control the switchover between the total eight gears, i.e., seven forward gears and one reverse gear, in which some of the gears share a driving gear, so that both the total quantity of the parts and the axial length of the transmission are reduced.

In the present invention, because the diameters of the driven gears for the first, second and third gears are relatively large, the engagement sleeves of the corresponding synchronizers can be arranged inside these driven gears according to the structural arrangement requirements, thus greatly saving the axial space.

In the present invention, one reverse gear shaft and a gear thereon are omitted, which saves a space facilitating the arrangement of a gear shaft fork mechanism. Thus, owing to the absence of obstructions of the reverse gear shaft and the gear thereon, the supporting point of a gear shift fork can be arranged at a place close to the centers of the driving shafts and a gear shift execution mechanism, which is beneficial to the force distribution of the fork mechanism.

The present invention has been exemplarily described above with reference to the accompanying drawings. Apparently, the specific implementations of the present invention are not limited thereto. Various non-substantive improvements made based on the concepts and technical solutions of the present invention, or, any direct application of the concepts and technical solutions of the present invention in other occasions without any improvement, shall fall into the protection scope of the present invention.

The invention claimed is:

1. A dual-clutch transmission, comprising an input section, a driving section and an output section,
   the input section including a first input shaft (1) and a second input shaft (2), which are arranged coaxially,
   the first input shaft (1) being connected to a first clutch (K1), and the second input shaft (2) being connected to a second clutch (K2),
   the second input shaft (2) being a hollow shaft, which is sheathing outside the first input shaft (1),
   the driving section comprising a first driving shaft (18) and a second driving shaft (3),
   the output section comprising a differential (20), a primary reduction driven gear (20a) on the differential (20) being engaged with a first driving shaft primary reduction driving gear (19) on the first driving shaft (18) and a second driving shaft primary reduction driving gear (4) on the second driving shaft (3), respectively,
   the dual-clutch transmission being provided with seven forward gears (D1, D2, D3, D4, D5, D6, D7) and one reverse gear (R),
   characterized in that:
   a third-gear and fifth-gear driving gear (9), a first-gear driving gear (10) and a seventh-gear driving gear (11) are fixed on the first input shaft (1) in sequence;
   a second-gear driving gear (12) and a fourth-gear and six-gear driving gear (13) are fixed on the second input shaft (2) in sequence;
   the third-gear and fifth-gear driving gear (9) is located on a rear side of the transmission far away from the dual clutches, and the fourth-gear and six-gear driving gear (13) is located on a front side of the transmission close to the dual clutches;
   a third-gear driven gear (14), a first-gear driven gear (15), a second-gear driven gear (16) and a fourth-gear driven gear (17) are arranged on the first driving shaft (18) in sequence, and a first-gear and third-gear synchronizer (S2) and a second-gear and fourth-gear synchronizer (S3) are further fixed on the first driving shaft (18);
   the first-gear and third-gear synchronizer (S2) is located between the first-gear driven gear (15) and the third-gear driven gear (14), and the second-gear and fourth-gear synchronizer (S3) is located between the second-gear driven gear (16) and the fourth-gear driven gear (17);
   the third-gear driven gear (14) is located on the rear side of the transmission far away from the dual clutches, and the fourth-gear driven gear (17) is located on the front side of the transmission close to the dual clutches;
   a fifth-gear driven gear (8), a seventh-gear driven gear (7), a reverse-gear driven gear (6) and a sixth-gear driven gear (5) are arranged on the second driving shaft (3) in sequence, and a fifth-gear and seventh-gear synchronizer (S1) and a sixth-gear and reverse-gear synchronizer (S4) are further fixed on the second driving shaft (3);
   the fifth-gear and seventh-gear synchronizer (S1) is located between the fifth-gear driven gear (8) and the seventh-gear driven gear (7), and the sixth-gear and reverse-gear synchronizer (S4) is located between the sixth-gear driven gear (5) and the reverse-gear driven gear (6);
   the fifth-gear driven gear (8) is located on the rear side of the transmission far away from the dual clutches, and the sixth-gear driven gear (5) is located on the front side of the transmission close to the dual clutches;
   the first-gear driven gear (15), having a first-gear driven gear first gear (15a) and a first-gear driven gear second gear (15b), is a stepped gear idly which is sheathing around the first driving shaft (18);
   the first-gear driven gear first gear (15a) and the first-gear driven gear second gear (15b) are connected to each other without relative rotation; and
   the first-gear driven gear first gear (15a) is engaged with the first-gear driving gear (10), while the first-gear driven gear second gear (15b) is engaged with the reverse-gear driven gear (6) to realize a switchover of the reverse gear.

2. The dual-clutch transmission according to claim 1, characterized in that, the number of teeth of the first driving shaft primary reduction driving gear (19) on the first driving shaft (18) is less than the number of teeth of the second driving shaft primary reduction driving gear (4) on the second driving shaft (3);
   the reverse-gear driven gear (6) is engaged with the first-gear driven gear second gear (15b), the first-gear driven gear (15), the second-gear driven gear (16) and the seventh-gear driven gear (7) are engaged and located in a same plane with the first-gear driving gear (10), the second-gear driving gear (12) and the seventh-gear driving gear (11), respectively, the third-gear driven gear (14) and the fifth-gear driven gear (8) are engaged and located in a same plane with the third-gear and fifth-gear driving gear (9), and the fourth-gear driven gear (17) and the sixth-gear driven gear (5) are engaged and located in a same plane with the fourth-gear and six-gear driving gear (13); and when it is required to perform a gear shift of shifting one gear of the seven forward gears (D1, D2, D3, D4, D5, D6, D7) and the one reverse gear (R) to another gear thereof, a corresponding driven gear for the another gear is connected to a corresponding driving shaft from the first driving shaft (18) and the second driving shaft (3) via a corresponding synchronizer from the fifth-gear and seventh-gear synchronizer (S1), the first-gear and third-gear synchronizer (S2), the second-gear and fourth-near synchronizer (S3) and the sixth-gear and reverse-gear synchronizer (S4), to allow the corresponding driving shaft to synchronously rotate with the corresponding driven gear for the another gear, so as to realize the gear shift.

3. The dual-clutch transmission according to claim 1, characterized in that the diameter of the first-gear driven gear first gear (15a) is greater than that of the first-gear driven gear second gear (15b).

* * * * *